(12) United States Patent
Challancin

(10) Patent No.: US 10,079,488 B2
(45) Date of Patent: Sep. 18, 2018

(54) POWER SUPPLY APPARATUS

(71) Applicant: William M. Challancin, Terrell, NC (US)

(72) Inventor: William M. Challancin, Terrell, NC (US)

( * ) Notice: Subject to any disclaimer, the term of this patent is extended or adjusted under 35 U.S.C. 154(b) by 194 days.

(21) Appl. No.: 14/974,086

(22) Filed: Dec. 18, 2015

(65) Prior Publication Data

US 2016/0244006 A1 Aug. 25, 2016

Related U.S. Application Data

(60) Provisional application No. 62/118,900, filed on Feb. 20, 2015.

(51) Int. Cl.
*H02J 1/00* (2006.01)

(52) U.S. Cl.
CPC ............ *H02J 1/00* (2013.01); *H02J 2001/008* (2013.01)

(58) Field of Classification Search
CPC ........................................................ H02J 1/00
See application file for complete search history.

(56) References Cited

U.S. PATENT DOCUMENTS

| 4,449,787 A | * | 5/1984 | Burbo | A42B 3/042 |
| | | | | 313/524 |
| 5,473,527 A | | 12/1995 | Gold | |
| 5,596,491 A | | 1/1997 | Gold | |
| 5,815,126 A | * | 9/1998 | Fan | G02B 27/017 |
| | | | | 345/7 |
| 7,303,302 B2 | | 12/2007 | Harris | |
| 7,859,874 B2 | | 12/2010 | Bovitz | |
| 7,905,620 B2 | | 3/2011 | Harris | |
| 8,687,394 B2 | | 4/2014 | Cottingham et al. | |
| 8,760,004 B2 | | 6/2014 | Weale | |
| 8,908,389 B2 | | 12/2014 | Teetzel et al. | |
| 2005/0254136 A1 | * | 11/2005 | Blomqvist | B64D 10/00 |
| | | | | 359/630 |
| 2007/0057576 A1 | | 3/2007 | Lee | |
| 2014/0096310 A1 | | 4/2014 | Szalkowski et al. | |

* cited by examiner

*Primary Examiner* — Joseph Chang
(74) *Attorney, Agent, or Firm* — Ashley Law Firm P.C.; Stephen S. Ashley, Jr.

(57) ABSTRACT

A power supply apparatus for use with an aircraft can include an aircraft interface input adapted for operatively connecting to and receiving DC power from an aircraft's power bus, and a single connection input adapted for operatively connecting to and supplying power and communications to a plurality of aircraft devices. The apparatus can include a DC to DC electrical converter that converts the DC power received from the aircraft power bus and converts the power to appropriate voltages for powering the aircraft devices.

20 Claims, 6 Drawing Sheets

US 10,079,488 B2

POWER SUPPLY APPARATUS

CROSS REFERENCE TO RELATED APPLICATIONS

This application claims priority to U.S. Provisional Patent Application No. 62/118,900, filed Feb. 20, 2015, and which is incorporated herein by reference.

TECHNICAL FIELD OF INVENTION

The present invention relates to a power supply apparatus. An embodiment of the invention comprises an integrated communication and power supply apparatus for providing direct current (DC) electrical power and a communications interface and selection to aviation helmets, such as civilian and military aviation helmets (pilot and crewman).

BACKGROUND OF INVENTION

Typical military aviation helmets have multiple accessories attached to them in addition to the standard communications microphone and headphones. Such accessories include night vision goggles (NVG), helmet mounted flashlights (lip light), and active noise reduction units (ANR). These accessories are typically powered by commercial AA, 9V, or special half size AA Lithium-ion (½ AA Li-ion) batteries that are attached to the helmet in various ways. As such, aircrew must carry replacement batteries to replace the batteries in operation when they are depleted. Pilots and crewmen are often required to change these batteries in flight. This can be difficult, inconvenient, and at times dangerous in today's high workload tactical aircraft. Additionally, the ½ AA Li-ion batteries are expensive and very difficult (if not impossible) to find in countries outside of the United States.

Currently many civilian aircraft, and some non-standard military aircraft require the pilot to unplug and switch communications cords when switching from the helmet mounted microphone to the oxygen mask mounted microphone. This is inconvenient at best, and dangerous at worst. As such, there is a need for a cockpit-mounted unit that provides DC electrical power (drawn from the aircraft electrical system) to the pilots helmet mounted accessories, and the ability to select microphone input without unplugging and swapping cords.

SUMMARY OF INVENTION

One object of the present invention is to provide an apparatus that provides both DC power and communications interfaces to aircrew helmets, such as in tactical fixed and rotor wing aircraft. Another object of the present invention is to eliminate the need for batteries to power ANR, NVGs and lip lights. Another object of the present invention is provide an integrated communications and power supply unit that provides for microphone selection, without the need to unplug and switch wires in flight, while providing more redundancy and safety than currently available systems.

Another object of the present invention is to provide a self-contained means of converting 14 or 28 Volt DC electricity taken from the aircraft DC electrical bus and converting it, through the use of DC to DC electrical converters, and supplying that power to pilot or crewman helmets. Yet another object of the present invention is to provide an integrated communications and power supply unit that allows the operator to select between the helmet-mounted microphone and the oxygen mask mounted microphone with the flick of a switch. These and other objects of the invention can be achieved in various embodiments of the invention disclosed below.

According to another embodiment of the invention, the power apparatus utilizes a special 10-conductor power and communications cable assembly for use with modified helmets. Provisions can be provided on the face of the unit for standard civilian/military communications jacks, wired in parallel to the circuitry of the special 10-conductor power and communications plug. This feature allows the use of unmodified (off the shelf) helmets in aircraft equipped with the power apparatus.

DESCRIPTION OF PREFERRED EMBODIMENTS OF THE INVENTION AND BEST MODE

Figure 1:
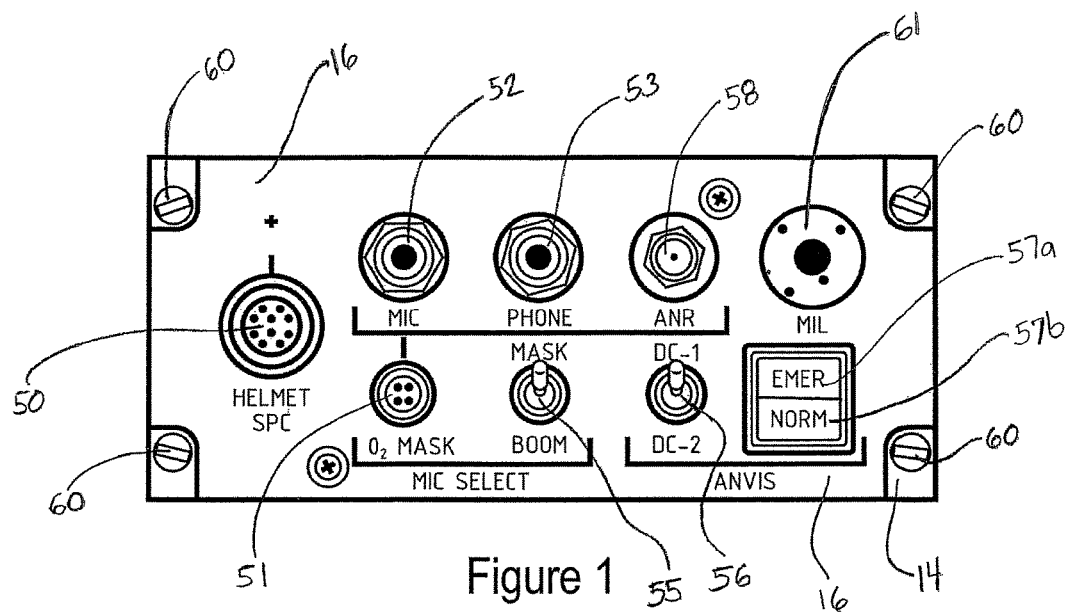
FIG. 1 is a front view of a power supply apparatus according to a preferred embodiment of the invention.
Figure 2:
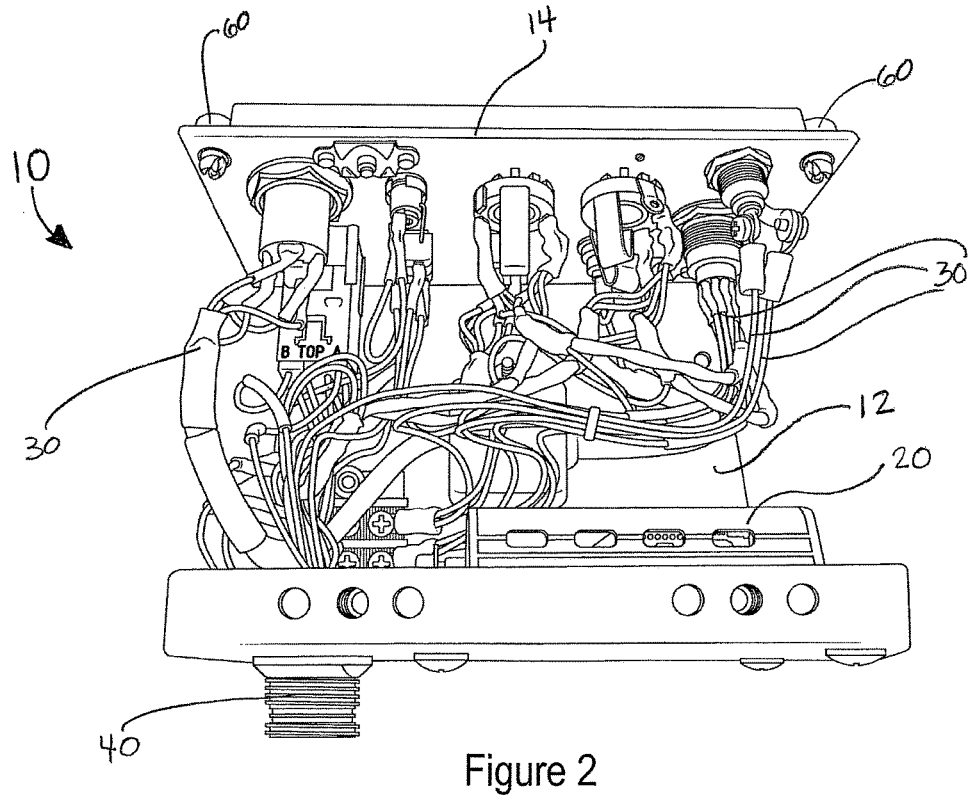
FIG. 2 is a perspective view of the power supply apparatus of FIG. 1.

An integrated communication and power supply apparatus according to a preferred embodiment of the invention is illustrated in FIGS. 1-4, and shown generally at reference numeral 10. As shown in FIG. 2, the integrated communication and power supply ("ICAPS") apparatus 10 comprises a main body 12 and cover assembly (faceplate) 14 that can be constructed out of 0.063 thickness 6061 T4 aluminum. The body 12 and cover assembly 14 can be laser cut to specification and formed using a computer numerically controlled (CNC) press brake. Metal can be treated with a corrosion inhibiter prior to assembly.

Internally affixed to the aluminum body 12 is a DC to DC electrical converter 20, wiring and circuitry 30, and an aircraft connection plug (cannon plug) 40, as shown in FIG. 2. Also, a grounding block can be affixed to the body 12. The converter 20 can be the DC converter sold by Lonstar Aviation under the name LONSTAR 3.3VDC.

As shown in FIGS. 1 and 2, mounted at the faceplate 14 of the unit 10 is a cable plug 50 (referred to herein as a "single plug connect"), an oxygen mask jack 51, a standard microphone jack 52, standard headphone jack 53, switches 55-57, standard ANR jack 58, and attachment hardware such as Dzus fasteners 60. For installation into aircraft without Dzus rail or insufficient space, there can be alternative mounting options. Preferably, the unit 10 has a standard width of 5.90 inches, which fits into standard aviation radio racks utilizing military Dzus rail attachment. The cable plug 50 can be a ten pin LEMO brand "push to latch" connector. The oxygen mask jack 51 can be a four pin LEMO brand connector.

An edge lit (back lit) faceplate overlay panel 16 can be attached to the front of the faceplate 14 to illuminate the switch and plug labeling so that the unit 10 is night vision goggles (NVG)/night vision imaging system (NVIS) compatible for night/NVG operations. The unit 10 can include a dimmer switch 59 for the edge lit panel 16. The intensity of this lighting can be controlled by one of the aircraft instrument panel dimming controllers.

Figure 6:
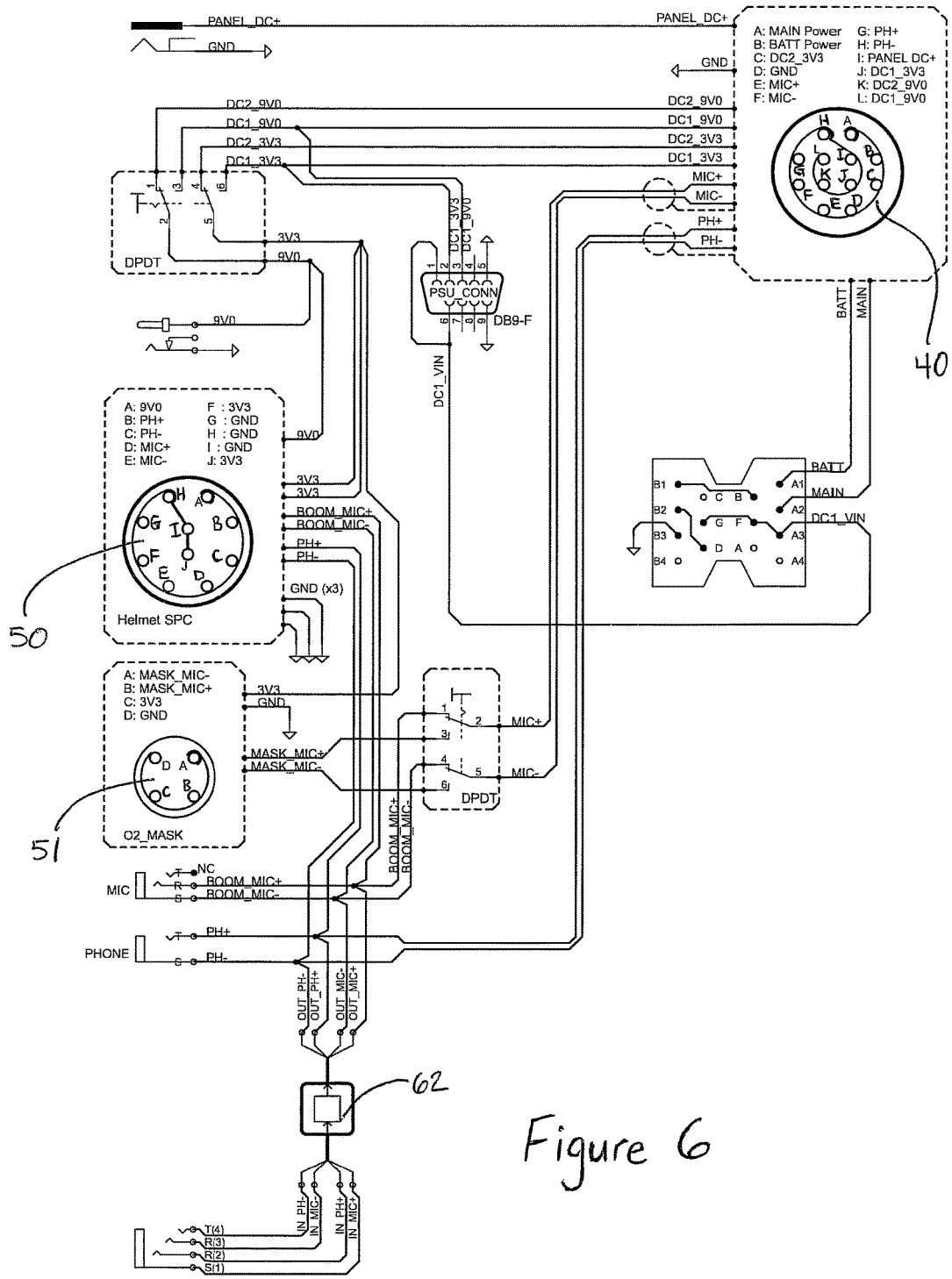
FIG. 6 is a schematic view of electrical wiring of the power supply apparatus according to an embodiment of the invention.

The unit 10 can be installed into the redundant space of the radio rack of an aircraft. Aircraft interface (i.e., the connection between aircraft systems and the ICAPS unit 10) can be accomplished through the use of a military spec connector, such as the cannon plug 40 located at the back of the unit 10, as shown in FIG. 2. Required connections from the aircraft are the following:

1) 14 or 28 Volt DC power from aircraft avionics bus
2) 14 or 28 Volt DC power from aircraft emergency battery
3) 3.5 Volt DC input from $2^{nd}$ (CAPS unit (DC-2)
4) Aircraft ground
5) Microphone high
6) Microphone low
7) Headphone high
8) Headphone low
9) Instrument lighting The cannon plug 40 connects to and receives power from an aircraft's avionics power bus. The cannon plug 40 is connected to the converter 20. The converter 20 connects to the cannon plug 40 and the single plug connect 50. The single plug connect plug 50 feeds power to the aircrew helmet's NVG, lip light, and microphone/speaker. The electric wiring of the unit 10 can be configured as illustrated in FIG. 6.

The unit 10 can provide a self-contained means of converting 14 or 28 Volt DC electricity taken from the aircraft's DC electrical bus and converting it, through the use of the DC to DC electrical converter 20, and supplying that power to the pilot or co-pilot's helmets. The unit 10 can supply 3.5 VDC for the night vision goggles and lip light, and 9VDC for the active noise reduction (ANR) headset. The converter 20 converts the 28 volts of electricity supplied by the DC power of the aircraft into the voltage needed for powering the night vision goggles, lip light, noise reduction and microphone/speakers.

Figure 3:
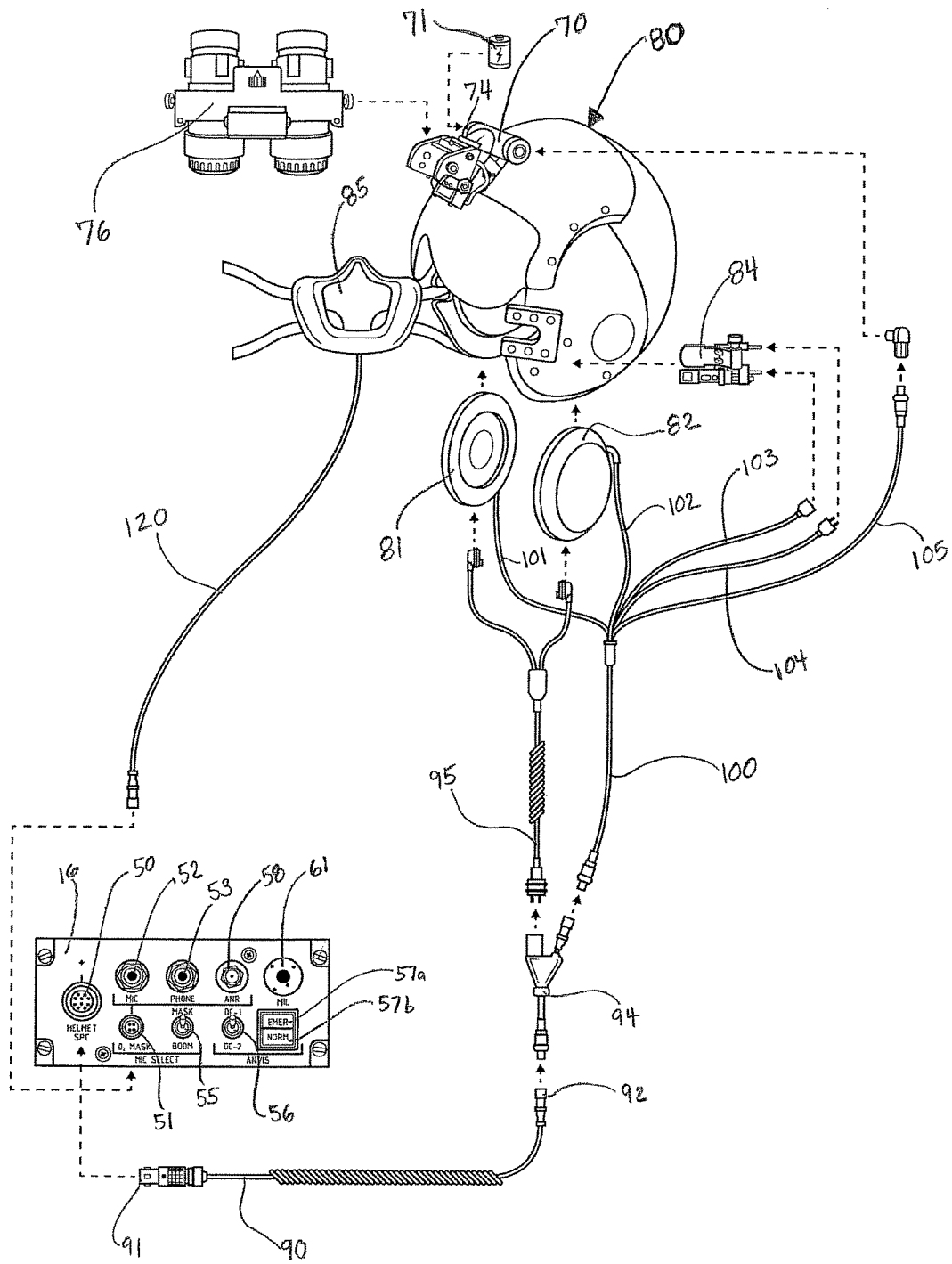
FIG. 3 is an exploded environmental view of the power supply apparatus of FIG. 1 according to an embodiment of the invention.

The ICAPS unit 10 delivers the DC power along with aircraft communications (microphone and headphones inputs) via an aircraft interface cable 90, referred to herein as a single plug connect cable, shown in FIG. 3. The single plug connect cable 90 can be a single 10-conductor cable that connects the ICAPS unit 10 to an aircrew helmet 80, as shown in FIG. 3. As shown in FIG. 3, one end 91 of the cable 90 connects to the single plug connect plug 50 on the ICAPS unit 10. The other end 92 of the cable 90 can be connected to a communication ear piece splitter 94, such as is sold under the mark ACCES by Westone Laboratories, Inc. The communication ear piece splitter 94 can be connected to a communication ear piece cable 95, such as is sold under the mark ACCES by Westone Laboratories, Inc., as shown in FIG. 3. The communication earpiece cable 95 provides audio to in-ear speakers that are inserted into the outer ear canal of the pilot, and worn under audio speaker cups 81, 82 of the helmet 80. The communication earpiece splitter 94 also connects to a helmet primary cord 100, as shown in FIG. 3. The helmet primary cord 100 splits into five cables 101-105. Two cables 101, 102 connect to and provide power to the audio speaker cups 81, 82 of the helmet 80. Third cable 103, connects to the lip light 84 and supply power to the lip light 84. The fourth cable 104 connects the helmet mounted boom microphone to the aircraft audio system. The fifth cable 105 connects to an adaptor 70 connected to the night vision goggles 76 of the helmet 80, supplying power to the night vision goggles 76.

As shown in FIG. 3, the adaptor 70 can include a battery, such as a half size AA battery 71, as a back-up power source for the night vision goggles (NVG) 76. The adaptor 70 can have a screw-on cap 74 positioned opposite the cable 105. The cap 74 can be removed, and the half size AA battery 71 can be inserted into the adaptor 70.

Figure 4:
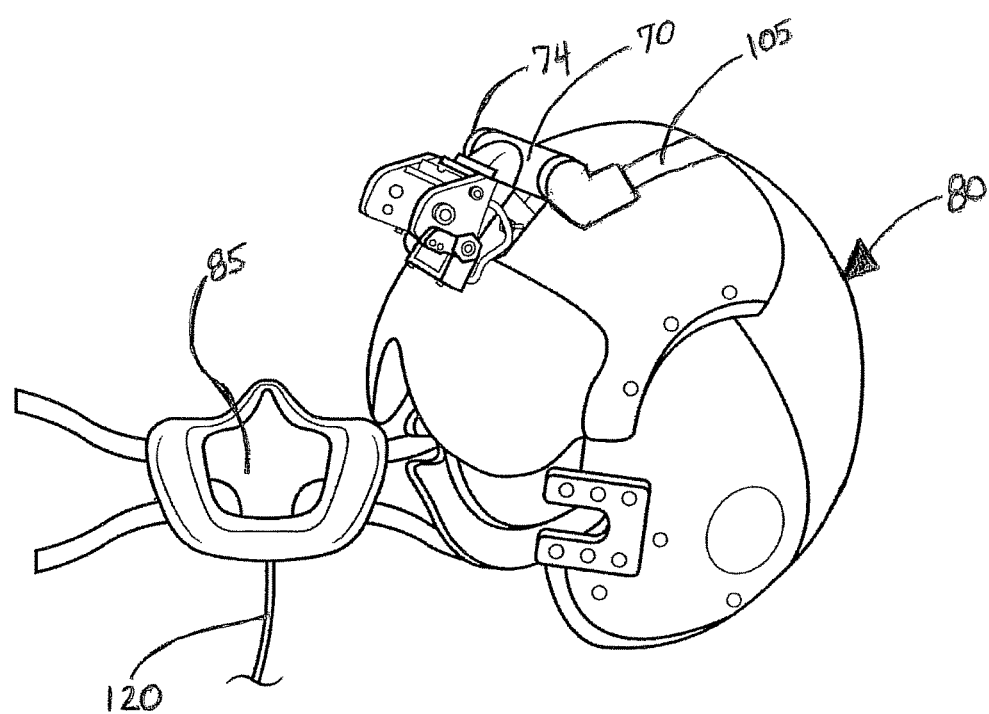
FIG. 4 is an enlarged perspective view of an aircrew helmet according to an embodiment of the invention.

The unit 10 includes means for powering the oxygen mask microphone. As shown in FIG. 1, an oxygen mask input jack 51 is provided with [MASK/BOOM] selector switch 55. As shown in FIGS. 3 and 4, an oxygen mask interface cable 120 connects to the oxygen mask input 51 and to the oxygen mask 85 on the helmet 80. As such, the unit 10 allows for the use of oxygen masks with no electrical interface between the helmet 80 and mask 85.

The unit 10 provides for selection between mask and helmet microphones. To use the oxygen mask mounted microphone, the selector switch 55 is positioned upward in the MASK position, as shown in FIG. 1. When the pilot wants to use helmet mounted microphone, the selector switch is positioned downward in the BOOM position. As such, the pilot does not have to unplug and switch communications cords when switching between the helmet mounted microphone and the oxygen mask mounted microphone.

According to a preferred embodiment of the invention, a helmet modification kit can be provided for use with aircraft helmets such as HGU-55/P or HGU-56/P type helmets. The kit includes standard helmet plug downloads, NVG lip light, and ANVIS power plug, in addition to the single plug connect cable 90. The kit allows for the use of the helmet 80, which is adapted for use with the ICAPS unit 10, to also be used in aircraft not equipped with the ICAPS unit 10. Similar kits can also be provided for MSA Gallet and Alpha helmets.

Figure 5:
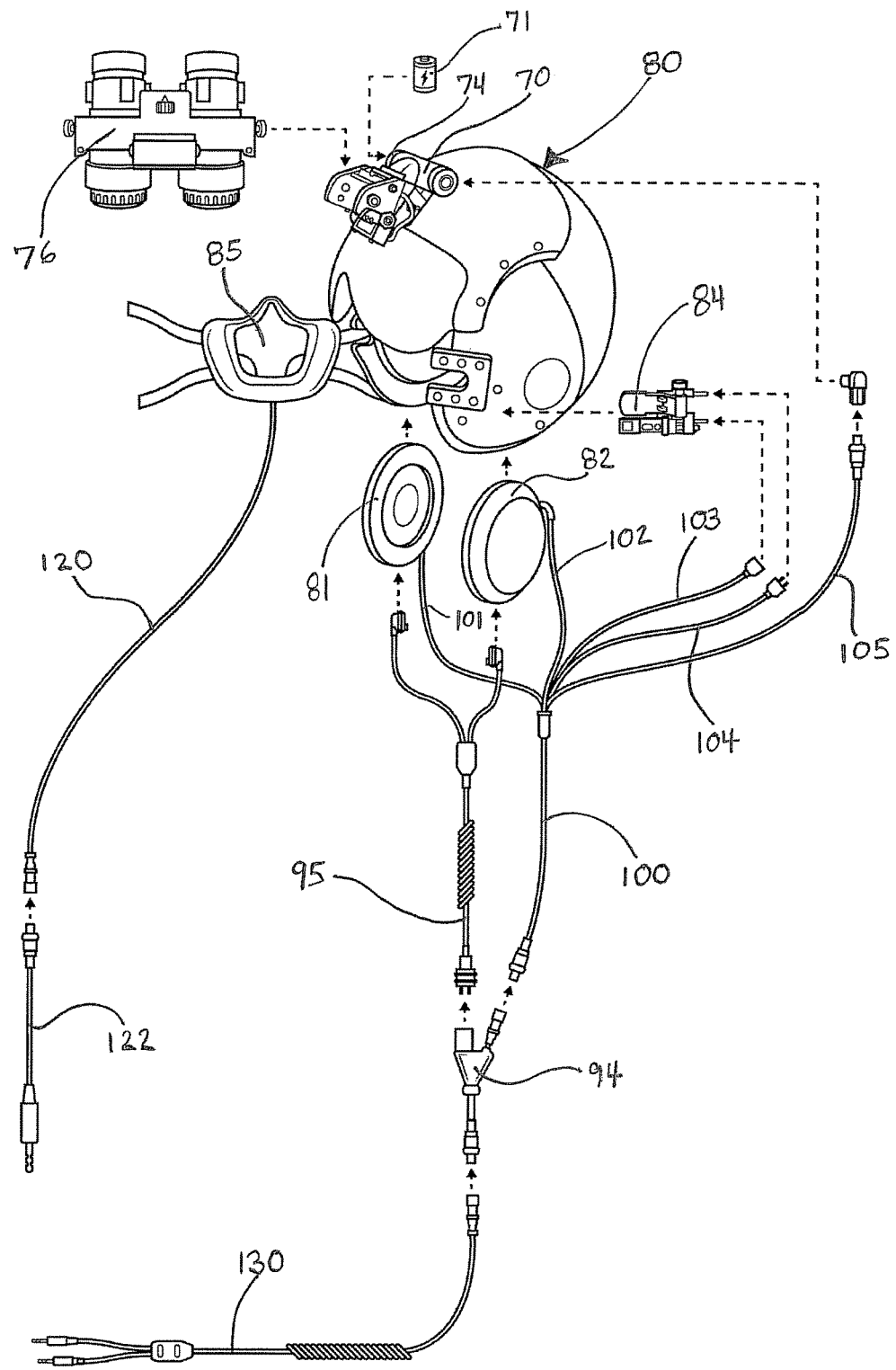
FIG. 5 is an exploded view of another embodiment of the invention.

The kit includes a standard aircraft interface cable 130, shown in FIG. 5, having dual general aviation plugs for connecting to standard microphone and speaker jacks of an aircraft. Alternatively, the standard aircraft interface cable can include an ANR plug. The single plug connect cable 90 can be replaced with the standard aircraft interface cable 130 and connected to the communication earpiece splitter 94, as shown in FIG. 5. This enables use of the helmet 80 on aircraft that is not equipped with the ICAPS unit 10.

The helmet modification kit can also include a microphone plug adaptor 122 that can connect to the oxygen mask interface cable 120, as shown in FIG. 5. The microphone plug adaptor 122 has a plug that connects to standard aircraft oxygen mask microphone jacks. As such, the oxygen mask microphone of the helmet 80 can be used in an aircraft that is not equipped with the ICAPS unit.

Installation of the ICAPS unit 10 does not limit the use of standard helmets or headsets that are not adapted for use with the ICAPS unit 10. The ICAPS unit 10 includes a standard microphone jack 52, standard headphone jack 53 and standard ANR jack 58. This allows for the use of standard (off the shelf) helmets in aircraft equipped with the ICAPS unit 10.

The unit 10 can include a standard military U-174/U jack 61 and an internal low to high impedance adapter 62. As such, the unit 10 enables the use of a military low-impedance helmet with a standard military U-174/U plug in aircraft fitted with civilian, high impedance radios.

In a preferred embodiment of the invention, two ICAPS units 10 can be installed for the pilot and co-pilot. In this embodiment, NVG power redundancy can be provided in several ways. This can be accomplished through the ability of the pilot to draw power from the co-pilots ICAPS (and vice versa) during an electrical malfunction, or failure. If the pilot's ICAPS converter fails during operation, the pilot can select to use power from the co-pilot's ICAP unit (labeled "DC-2") by moving switch 56, shown in FIG. 1, to the DC-2 position.

The ICAPS unit 10 also provides an additional level of redundancy through the incorporation of an emergency mode that can be activated and deactivated via push buttons 57a, 57b. One button 57a can be labeled "EMER", as shown in FIG. 2. In the event of a total aircraft electrical failure, pressing the EMER button 57a causes the unit 10 to draw power from the aircraft's emergency battery. To return to normal operations, the other button 57b (labeled "NORM") is pressed, causing the unit 10 to draw power from the aircraft avionics bus. The EMER button 57a and NORM button 57b can be back lit such that each button 57a, 57b lights up when pressed to indicate which mode (EMER or NORM) has been selected. The light can be NVG compatible.

As another redundancy measure, the ½ size AA battery 71 is maintained within the helmet 80 for use during power cable failure or when a pilot requires the use of night vision goggles when aircraft power is not available, such as during pre-flight or in combat escape and evasion scenarios.

The ICAPS unit 10 provides both DC power and communications interfaces to aircrew helmets in tactical fixed and rotor-wing aircraft. The ICAPS unit 10 eliminates the need for batteries to power ANR, NVGs and lip lights. The unit 10 can be mounted via 2.5" section of Dzus rail (11' depth). Custom mounts are available to suit fixed and rotor-wing aircraft. The unit 10 includes speaker and ANR power input to the helmet 80 through the single plug connect 50 or standard helmet/headset jacks 52, 53, 58.

The unit 10 provides regulated 3.5 volt DC input for aviator's night vision imaging system (ANVIS-6/9) and NVG lip light through the single plug connect 50. The NVG and lip light power is provided through redundant wiring by two independent and selectable DC-DC converters.

The DC converters are powered off the aircraft avionics bus during normal [NORM] operations, or off the standby avionics battery during emergencies (EMER). Aircraft master or avionics bus need not be selected in emergency mode. An NVIS compatible push-to-test light can be provided on the control head of the ICAPS unit 10 to test for the presence of emergency voltage and indicate when emergency mode is selected.

Nine volt DC power for the helmet mounted active noise reduction (ANR) system can be provided through the single plug connect 50 or the standard ANR helmet jack 58. The ICAPS unit 10 control head labeling can be illuminated by a dimmable NVIS compatible edge lit panel, which can conform to MIL-DTL-7788 specification.

The unit 10 can include a stand-alone aircraft backup battery (28 Volt DC), if the aircraft is not equipped with an emergency standby battery. The ICAPS unit 10 can be tested to the following specifications: MIL-STD-810G, and or DO-160D, and can be certified under the Federal Aviation Administration's Supplemental Type Certificate (STC).

Figure 7:
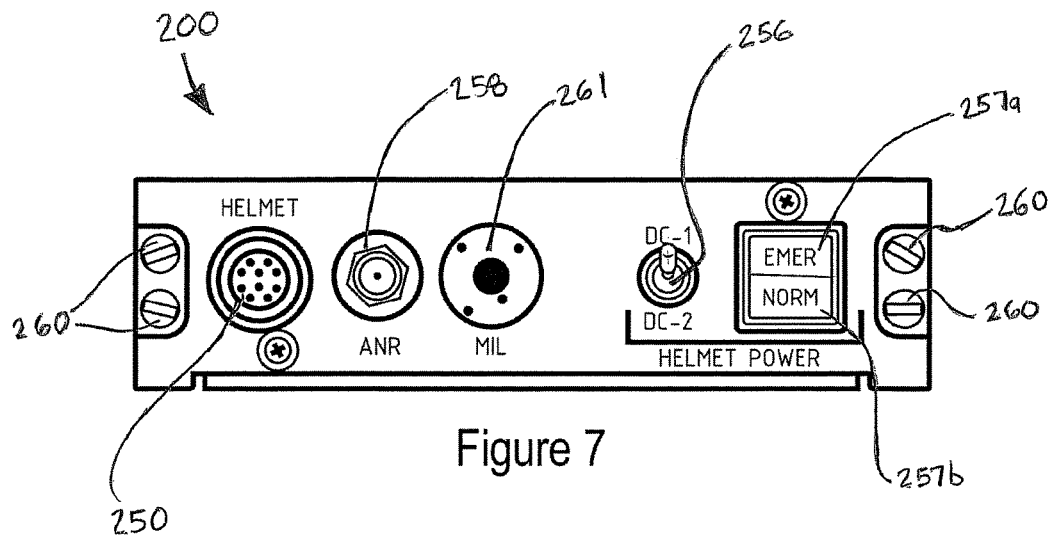
FIG. 7 is a front view of a power supply apparatus according to another embodiment of the invention.

In another preferred embodiment of the invention, an integrated communication and power supply ("ICAPS") apparatus 200 is adapted for use in helicopters. The ICAPS unit 200 can be identical in structure to the previously described ICAPS unit 10, except that the ICAPS unit 200 does not include separate mic and phone jacks, an oxygen mask plug/switch or internal impedance adapter. As shown in FIG. 7, the ICAPS unit 200 includes a single plug connect 250, DC selection switch 256, emergency/normal power buttons 257a, 257b, standard ANR jack 258, standard military U-174/U jack 261, and attachment hardware such as Dzus fasteners 260.

A power supply apparatus and method of using same are described above. Various changes can be made to the invention without departing from its scope. The above description of the preferred embodiments and best mode of the invention are provided for the purpose of illustration only and not limitation.

What is claimed is:

1. A power supply apparatus for use with an aircraft comprising:
   (a) an aircraft interface input adapted for operatively connecting to and receiving DC power from an aircraft power source having a first voltage;
   (b) a single connection input adapted for operatively connecting to and supplying power and audio to a plurality of aircraft helmet devices;
   (c) a DC to DC electrical converter adapted for converting the DC power received from the aircraft power source having the first voltage to a converted DC power having a second voltage adapted for powering the plurality of aircraft helmet devices; and
   (d) an oxygen mask jack adapted for operatively connecting to and supplying power to an oxygen mask microphone attached to an oxygen mask connected to an aircraft helmet, whereby the oxygen mask microphone can be powered without an electrical interface between the oxygen mask and the helmet.

2. The power supply apparatus according to claim 1, wherein the plurality of aircraft helmet devices comprises at least one selected from the group consisting of night vision goggles, a helmet mounted flashlight, an active noise reduction device, an audio speaker, a helmet mounted microphone and an oxygen mask mounted microphone.

3. The power supply apparatus according to claim 1, wherein the aircraft interface input comprises a cannon plug, the aircraft power supply comprises an electrical bus, and the single connection input comprises a ten pin connector.

4. The power supply apparatus according to claim 1, wherein the first voltage is selected from the group consisting of 14 volts and 28 volts.

5. The power supply apparatus according to claim 1, further comprising a housing supporting the aircraft interface input, the single connection input, and the DC to DC electrical converter, wherein the housing is adapted for being installed in redundant space of a radio rack of the aircraft.

6. The power supply apparatus according to claim 1, wherein the plurality of aircraft helmet devices comprises a helmet mounted microphone, and further comprising a selector switch adapted for switching between supplying power to the helmet mounted microphone and the oxygen mask microphone.

7. The power supply apparatus according to claim 1, further comprising a standard microphone jack, and a standard headphone jack.

8. The power supply apparatus according to claim 1, further comprising a night vision goggles adaptor adapted for mounting on and operatively connecting to the night vision goggles.

9. The power supply apparatus according to claim 8, further comprising a single plug connect cable operatively connected to the single connection input and the night vision goggles adaptor, whereby the night vision goggles are supplied power.

10. The power supply apparatus according to claim 9, wherein the night vision goggles adaptor comprises a secondary power source for powering night vision goggles comprising a battery.

11. A power supply kit comprising:
(a) an aircraft interface input adapted for operatively connecting to and receiving DC power from an aircraft power source having a first voltage;
(b) a single connection input adapted for operatively connecting to a plurality of aircraft helmet devices comprising night vision goggles, an audio speaker, and a helmet mounted microphone;
(c) a DC to DC electrical converter adapted for converting the DC power received from the aircraft power source having the first voltage to a converted DC power having a second voltage adapted for powering the plurality of aircraft helmet devices;
(d) a housing supporting the aircraft interface input, the single connection input, and the DC to DC electrical converter, wherein the housing is adapted for being installed in redundant space of a radio rack of the aircraft;
(e) a night vision goggles adaptor adapted for mounting on and operatively connecting to the night vision goggles; and
(f) a single plug connect cable operatively connected to the single connection input and the adaptor, whereby the night vision goggles are supplied power.

12. The power supply kit according to claim 11, further comprising an oxygen mask jack adapted for operatively connecting to and supplying power to an oxygen mask microphone attached to an oxygen mask connected to an aircraft helmet, whereby the oxygen mask microphone can be powered without an electrical interface between the oxygen mask and the helmet.

13. The power supply kit according to claim 12, wherein the plurality of aircraft helmet devices comprises a helmet mounted microphone, and further comprising a selector switch adapted for switching between supplying power to the helmet mounted microphone and the oxygen mask microphone.

14. The power supply kit according to claim 11, wherein the night vision goggles adaptor comprises a secondary power source for powering night vision goggles comprising a battery.

15. A power supply kit comprising:
(a) an aircraft interface input adapted for operatively connecting to and receiving DC power from an aircraft power source having a first voltage;
(b) a single connection input adapted for operatively connecting to a plurality of aircraft helmet devices comprising night vision goggles, an audio speaker, and a helmet mounted microphone;
(c) a DC to DC electrical converter adapted for converting the DC power received from the aircraft power source having the first voltage to a converted DC power having a second voltage adapted for powering the plurality of aircraft helmet devices;
(d) a night vision goggles adaptor adapted for mounting on and operatively connecting to the night vision goggles; and
(e) a single plug connect cable operatively connected to the single connection input and the adaptor, whereby the night vision goggles are supplied power.

16. The power supply kit according to claim 15, wherein the night vision goggles adaptor comprises a secondary power source for powering night vision goggles comprising a battery.

17. The power supply kit according to claim 15, further comprising an oxygen mask jack adapted for operatively connecting to and supplying power to an oxygen mask microphone attached to an oxygen mask connected to an aircraft helmet, whereby the oxygen mask microphone can be powered without an electrical interface between the oxygen mask and the helmet.

18. The power supply kit according to claim 17, wherein the plurality of aircraft helmet devices comprises a helmet mounted microphone, and further comprising a selector switch adapted for switching between supplying power to the helmet mounted microphone and the oxygen mask microphone.

19. The power supply kit according to claim 18, further comprising a housing supporting the aircraft interface input, the single connection input, and the DC to DC electrical converter, wherein the housing is adapted for being installed in redundant space of a radio rack of the aircraft.

20. The power supply kit according to claim 18, further comprising a standard microphone jack, and a standard headphone jack.

* * * * *